[84.]
N. B. MOODY. Improvement in Corn Planters.
No. 119,470. Patented Oct. 3, 1871.
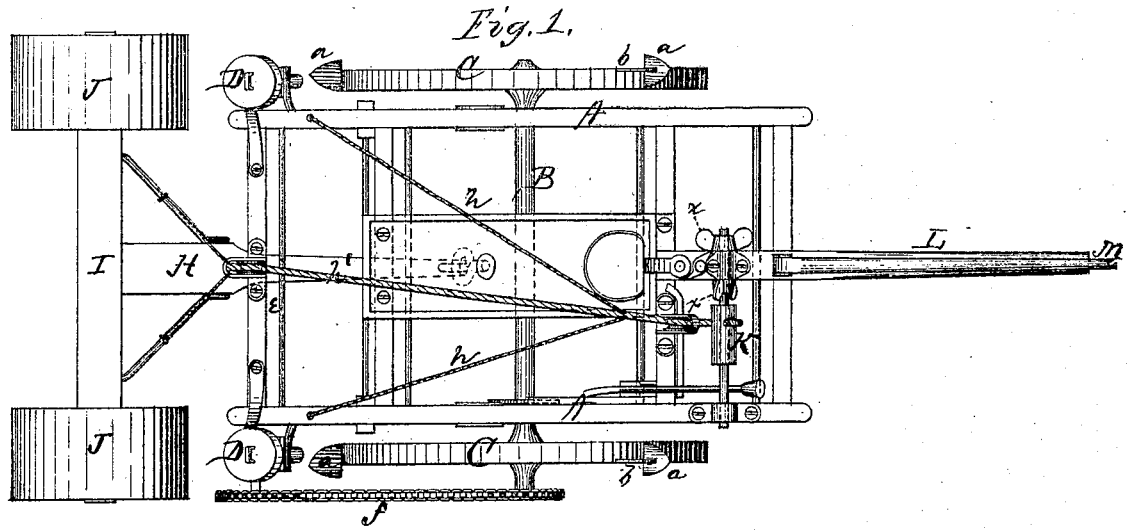
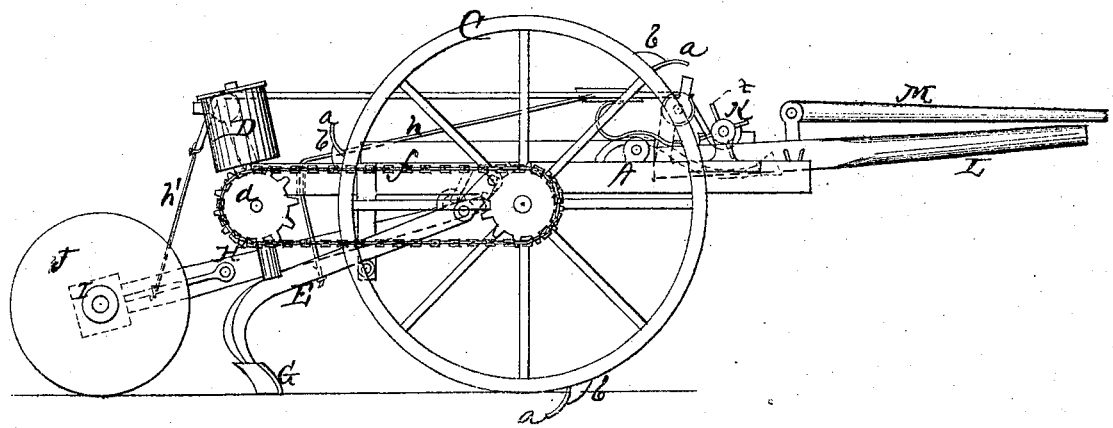
Witnesses
Jno. N Ellis.
J. V. White
Inventor
N. B. Moody,
Per
F. N. Alexander
Atty.

UNITED STATES PATENT OFFICE.

NELSON B. MOODY, OF WOODMAN, WISCONSIN, ASSIGNOR TO HIMSELF AND JOHN MURRAY, OF SAME PLACE.

IMPROVEMENT IN CORN-PLANTERS.

Specification forming part of Letters Patent No. 119,470, dated October 3, 1871.

*To all whom it may concern:*

Be it known that I, NELSON B. MOODY, of Woodman, in the county of Grant and State of Wisconsin, have invented certain new and useful Improvements in Seeding-Machines; and I do hereby declare that the following is a full, clear, and exact description thereof, reference being had to the accompanying drawing and to the letters of reference marked thereon which form a part of this specification.

The nature of my invention consists in the construction and arrangement of a corn-planter designed to mark in squares or rows both ways and at equal distance, drop, cover, and roll either corn, cotton, beans, pease, &c., and to mark out the ground for all kinds of farm produce that is grown in rows.

In order to enable others skilled in the art to which my invention appertains to make and use the same, I will now proceed to describe its construction and operation, referring to the annexed drawing, in which—

Figure 1 is a plan view of my machine, and Fig. 2 is a side view of the same.

A represents the frame of my machine, through suitable boxes on which passes the axle B, having a driving-wheel, C, on each end. To the tires of these wheels, at equal distances apart, are attached shovels $a$ $a$, having each a metallic brace, $b$, in rear at the outer edge. The number of these shovels regulates the distance at which the corn, cotton, &c., is to be planted, the dropper in rear having corresponding cups or holes. The wheels of the full-sized machine will be made adjustable, so that the right-hand wheel can be used on the left side, and vice versa, which will be of great advantage in planting seed-corn, or in ground where there is a large amount of corn-stubble or other trash, which would be apt to clog the shovels if run the direct way. The braces $b$ $b$ will then be used in front to serve the double purpose of braces and cutters, working like a revolving colter to a plow. Upon the rear end of the frame A, directly in rear of each wheel C, is a hopper, D, under which is a drum or wheel, $d$, mounted upon a shaft, $e$. These drums have holes or cups, with set-screws in the bottom for regulating the amount of seed to be planted. The shaft $e$, with its two drums, $d$ $d$, is revolved by means of a chain or belt, $f$, connecting pulley on said shaft and on the end of the axle B, outside of one of the wheels. On the under side on each side of the frame, in rear of the axle, is hinged a beam, E, the rear end of which is bent downward and outward and provided with a plow-blade, G, set inclined so as to cover the corn or seed dropped by the dropper. In the center of the frame A is a platform, upon which the driver's seat is located. To the under side of this platform is hooked or otherwise attached a bar or tongue, H, attached to an axle, I, having a roller, J, upon each end for rolling the ground after the seed has been planted and covered. K represents a cylinder or windlass, situated so as to be worked from the driver's seat, and from the same three ropes or chains, $h$ $h$ and $h'$, pass over a pulley, $g$. From the same the chains $h$ $h$ lead through holes in the frame to the beams E E, and the third chain $h'$ passes over another pulley, $i$, to the roller in rear, so that by turning the windlass the plow-beams and rollers may be raised up from the ground in turning or going to and from the field. The windlass is operated by arms or treadles $t$ $t$, the ends of which are placed at right angles with each other, so that as the driver presses one treadle forward with one foot and the treadle passes beyond his reach the other treadle is brought in such position as to be operated by the other foot of the driver. Upon the tongue L is a marker, M, arranged on a swivel in such a manner that it can be turned to either side.

Having thus fully described my invention, what I claim as new, and desire to secure by Letters Patent, is—

1. The shovels $a$ $a$ with braces $b$ $b$, arranged so that when the shovels are reversed the braces act as cutters, in combination with the wheels C C, substantially as set forth.

2. The windlass K, with double arms or treadles $x$ $x$, in combination with the chains $h$ $h'$, pulleys $g$ $i$, plow-beams E E, and rollers J J, as and for the purposes set forth.

In testimony that I claim the foregoing as my own I affix my signature in presence of two witnesses.

N. B. MOODY.

Witnesses:
 JOHN MURRAY,
 AUSTIN RANSOM.